UNITED STATES PATENT OFFICE.

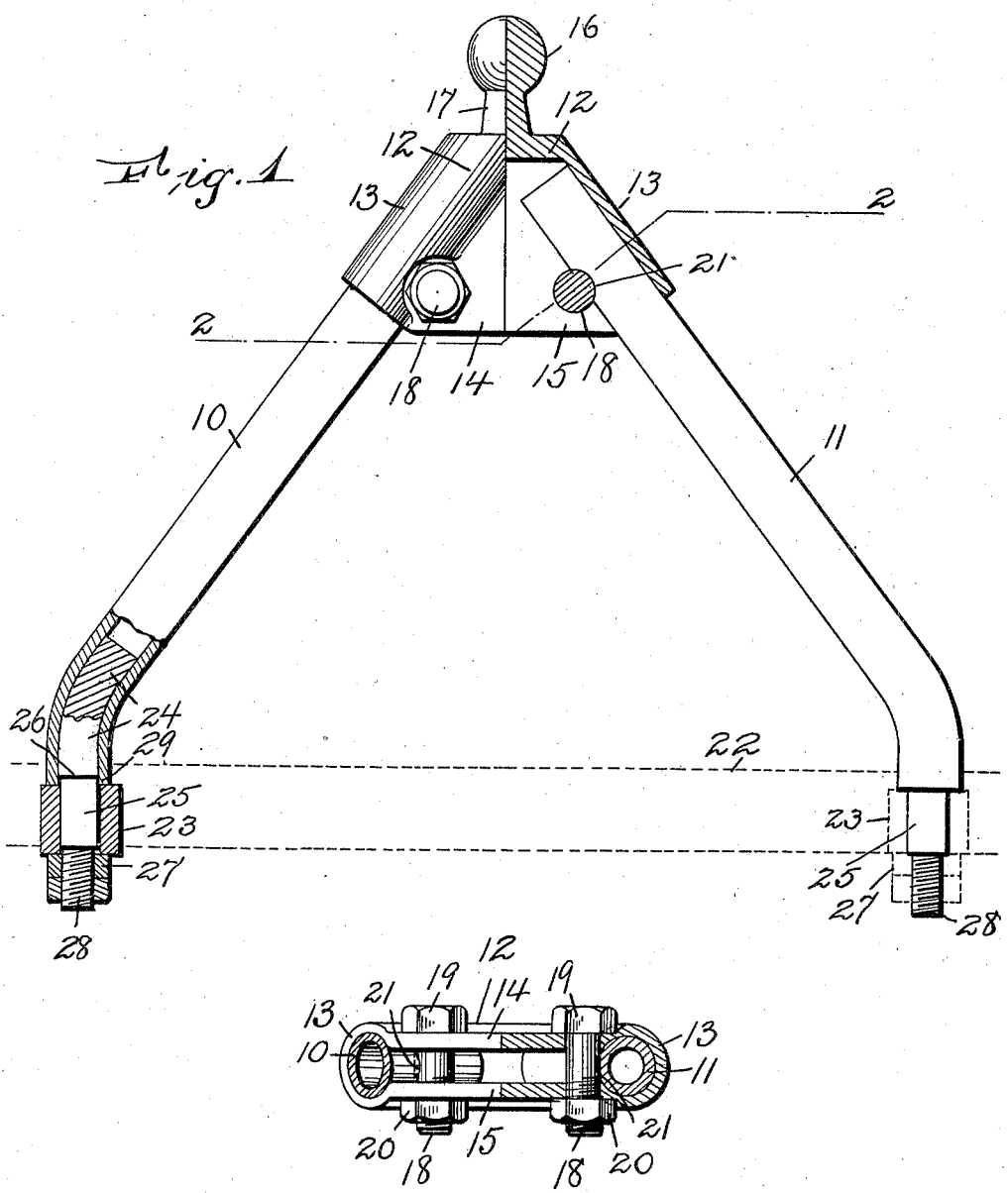

PETER H. SEERY, OF NEWARK, NEW JERSEY.

AXLE-BRACING FIXTURE.

1,322,064.  Specification of Letters Patent.  Patented Nov. 18, 1919.

Application filed April 17, 1919. Serial No. 290,769.

*To all whom it may concern:*

Be it known that I, PETER H. SEERY, a citizen of the United States, and a resident of Newark, county of Essex, and State of New Jersey, have invented certain new and useful Improvements in Axle-Bracing Fixtures, of which the following is a specification.

This invention relates to an improved fixture that is well adapted for use in bracing the axles of automobiles and the like, and particularly for use in connection with the radius rods on a Ford car.

The invention is designed to hold the converging ends of the radius rods so that the radius rods can be inserted or withdrawn from the fixture at that end of the device without the necessity of any brazing or other permanent fastening, so that in case of breakage or other necessity of replacement, the radius rods can be easily withdrawn or inserted.

The invention is also designed to provide a fastening means where the divergent ends of the rods are fastened to the braced element, such as the axle, to make a tight joint and one in which the rattling very often present at this part of the vehicle is minimized and in most cases eliminated.

The invention is illustrated in the accompanying drawing, in which Figure 1 is a top view, partly in section, showing the radius rods and the devices that are fastened to them for attaching them to the elements to be braced, and Fig. 2 is a section taken in general along the line 2—2 in Fig. 1.

The brace comprises divergent rods which are usually hollow for the most part to make the structure lighter, these rods 10 and 11 converging at one end and being fastened in a bracket 12. The bracket 12 is made so that it has channels to receive the converging ends of the rods 10 and 11 and is preferably made of one piece, having the end walls 13 to engage the ends of the rods and having the parallel top and bottom walls 14 and 15, the top and bottom walls being usually closer together than the diameter of the radius rods.

The bracket 12 is provided with suitable means for attaching it to a support, and when used on Ford cars, in order to attach it to the gear casing, this means consists of a ball 16 attached by a neck 17 to the main part of the bracket, and thus providing for a lateral or vertical motion to a limited degree.

In order to provide for a clamping of the radius rods in the bracket I provide a pair of bolts 18 which pass through the top and bottom walls 14 and 15, the head 19 and the nut 20 bearing on the walls so that the top and bottom walls can be drawn toward each other to give the end walls a clamping action on the radius rods. I prefer to situate these bolts 18 so that they pass through grooved or cut away parts 21 in the radius rods, thereby acting in each case as a key to the rod, preventing longitudinal movement of the rods relative to the bracket, and when the recessed part 21 is straight, it also resists any rotative movement of the rod, thereby reducing the strain on the divergent or outer end of the rod, as will be evident.

The outer or divergent ends of the rods 10 and 11 are adapted to be tightly secured to the braced element, such as the axle 22. The axle has a clip 23 which is suitably secured thereto, and the radius rod has a solid plug or pin 24, the rod and the pin both being bent at the same place, the plug 24 having a reduced extension 25 which forms a shoulder 26, the shoulder being inside of the tube, that is, the tube is a little longer than the main part of the plug, so that when the nuts 27 are screwed up tight on the screw-threaded portion 28 of the plug, the end 29 of the rod engages the clip 23 and the tendency is to pull the plug out of the tube, this being possible on account of the clearance between the shoulder 26 and the clip 23, and this tendency to pull the plug out causes all the parts to be tightly clamped and prevents any rattling. This also provides for taking up any looseness that might develop between the bent plug and the tube and holds these parts in tight contact, and it will also be noticed that this end of the radius rod is securely held in place without any brazed or welded parts being necessary.

In the bracket portion I prefer to place the nuts 20 underneath so that if, by accident, they should at any time drop off, the bolts 18 are still held in place and will prevent the withdrawal of the rods 10 and 11 from the bracket 12.

I claim:

1. A bracing fixture comprising divergent rods, a bracket having channels to receive the rods, and a pin passing through the bracket and tangentially through a rod.

2. A bracing fixture comprising a bracket with divergent channels therein and having separated top and bottom walls connecting the channel walls, rods with their ends in the channels, and bolts passing through the top and bottom walls of the bracket and tangentially through the rods.

3. A bracing fixture comprising a bracket with divergent channels therein and having separated top and bottom walls connecting the channel walls, rods with their ends in the channels, bolts passing through the top and bottom walls of the bracket and tangentially through the rods, and means on the bolts for forcing the said top and bottom walls toward each other.

4. A bracing fixture comprising a bracket with a headed projection on one end and having tubular divergent channels connected by separated top and bottom walls, rods in the channels, bolts passing through said walls and through the edges of the rods, and nuts on the bolts for drawing the walls toward each other.

5. A bracing fixture comprising a rod having a plug in the end, the plug having a shoulder thereon within the end of the rod, the rod and the plug being bent at the same point, a clip within which the plug is placed, and means for seating the plug in the clip and forcing the end of the rod against the clip.

6. A bracing fixture comprising a rod having a plug in the end, the plug having a shoulder thereon within the end of the rod, the rod and the plug being bent at the same point, a clip through which the plug passes, the plug having a screw-threaded end, and a nut on said end and bearing on the clip, whereby the rod is seated against the clip and the plug is placed under a tension within the rod.

In testimony that I claim the foregoing, I have hereto set my hand, this 14th day of April, 1919.

PETER H. SEERY.